US012569999B2

(12) United States Patent
Wales et al.

(10) Patent No.: US 12,569,999 B2
(45) Date of Patent: Mar. 10, 2026

(54) CONFIGURING AND MANAGING FLEETS OF DYNAMIC MECHANICAL SYSTEMS

(71) Applicant: SANCTUARY COGNITIVE SYSTEMS CORPORATION, Vancouver (CA)

(72) Inventors: Carolyn Wales, Campbell, CA (US); Chris Cianci, Campbell, CA (US); Christopher Bradski, Campbell, CA (US); Jeff Kranski, Campbell, CA (US); Adrian Kaehler, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 274 days.

(21) Appl. No.: 17/711,991

(22) Filed: Apr. 1, 2022

(65) Prior Publication Data

US 2022/0314448 A1 Oct. 6, 2022

Related U.S. Application Data

(60) Provisional application No. 63/169,719, filed on Apr. 1, 2021.

(51) Int. Cl.
*B25J 9/16* (2006.01)

(52) U.S. Cl.
CPC ............. *B25J 9/1682* (2013.01); *B25J 9/161* (2013.01); *B25J 9/162* (2013.01); *B25J 9/163* (2013.01); *B25J 9/1661* (2013.01); *B25J 9/1674* (2013.01); *B25J 9/1692* (2013.01)

(58) Field of Classification Search
CPC . B25J 9/1682; B25J 9/161; B25J 9/162; B25J 9/163; B25J 9/1661; B25J 9/1674; B25J 9/1692; B25J 13/006; G05B 2219/39024
See application file for complete search history.

(56) References Cited

U.S. PATENT DOCUMENTS

| | | | |
|---|---|---|---|
| 11,360,757 B1 * | 6/2022 | Roy | H04L 67/06 |
| 2014/0223334 A1 * | 8/2014 | Jensen | H04L 65/403 715/753 |
| 2016/0294646 A1 * | 10/2016 | Kirner | H04L 41/0895 |

(Continued)

FOREIGN PATENT DOCUMENTS

WO 2018051349 A1 3/2018

OTHER PUBLICATIONS

International Search Report, PCT/US2022/023170, Jul. 21, 2022.

(Continued)

*Primary Examiner* — Sohana Tanju Khayer
(74) *Attorney, Agent, or Firm* — Thomas Mahon; Adenike Adebiyi

(57) ABSTRACT

Provided is a distributed robot management system, including: a first fleet of robots at a first facility; and a robot management server system remote from the first facility and communicatively coupled with the first fleet of robots via a network, wherein the robot management server system is configured to: provide configuration information to the first fleet of robots, maintain a remote representation of state of robots in the first fleet of robots, receive and store data from the first fleet of robots, and provide computing resources by which robots in the first fleet of robots are trained.

12 Claims, 10 Drawing Sheets

(56)        References Cited

U.S. PATENT DOCUMENTS

| | | | |
|---|---|---|---|
| 2017/0132118 A1* | 5/2017 | Stefan | G06F 11/3684 |
| 2017/0237745 A1* | 8/2017 | Desai | H04L 63/104 |
| | | | 726/1 |
| 2017/0285628 A1* | 10/2017 | Erhart | B25J 13/006 |
| 2017/0339065 A1* | 11/2017 | Li | H04L 43/20 |
| 2018/0203994 A1* | 7/2018 | Shukla | G06F 21/45 |
| 2019/0266250 A1* | 8/2019 | Toplyn | G10L 15/26 |
| 2019/0374292 A1 | 12/2019 | Barral et al. | |
| 2020/0094411 A1* | 3/2020 | Tan | B25J 9/1661 |
| 2020/0324407 A1* | 10/2020 | Rajkumar | B25J 9/0003 |
| 2020/0376652 A1 | 12/2020 | Narusawa | |
| 2021/0034479 A1* | 2/2021 | Fukuta | G06F 9/45558 |
| 2021/0081752 A1 | 3/2021 | Chao et al. | |
| 2021/0103700 A1* | 4/2021 | Toplyn | G06N 20/00 |
| 2021/0252698 A1 | 8/2021 | Paxton et al. | |
| 2021/0253128 A1 | 8/2021 | Nister et al. | |
| 2021/0304559 A1* | 9/2021 | Cupersmith | G05D 1/0231 |
| 2021/0349444 A1* | 11/2021 | Hemmer | B25J 9/1664 |
| 2021/0357782 A1 | 11/2021 | Graves et al. | |
| 2021/0373576 A1* | 12/2021 | Sohn | B25J 9/1669 |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0084272 A1 | 3/2022 | Wang et al. | |
| 2022/0101627 A1 | 3/2022 | Pappas et al. | |
| 2022/0161427 A1* | 5/2022 | Yerazunis | B25J 9/1674 |
| 2022/0303753 A1* | 9/2022 | Zhu | H04W 8/08 |
| 2023/0325744 A1* | 10/2023 | Brugger | G06Q 50/08 |
| | | | 701/50 |

OTHER PUBLICATIONS

Written Opinion of the International Searching Authority, PCT/US2022/023170, Jul. 21, 2022.

Internet Archive of "Transfer Learning," Wikipedia, https://web.archive.org/web/20210331015532/https://en.wikipedia.org/wiki/Transfer_learning, Mar. 31, 2021, pp. 1-5.

* cited by examiner

```
task_id: pnp_103 description: Right to left pick and place task assets:
    task_package: pnp_103_101421_011.pkl
    robot_mods:    gv3_1_pnp_103.zip dependencies:
  - system:
      - tensorflow:2.1.0
      - giant_robotics:1.5
      - giant_camera:1.4
      - realsense_lib:1.2.7
      - ...
  - hardware:
      - camera: rs_d435, rs_d435i
      - finger_sensor: bb_201, bb_205
      - gpu: titan_v, 1080ti, 2080ti
```

```
cameras:
        type: rs_d435
        left:
                sn: 939622070907
        right:
                sn: 941322072560
finger_sensors:
        type: bb_201
        left:
                path: "pci-0000:00:14.0-usb-0:10.1:1.0-port0"
                baud: 230400
        right:
                path: "pci-0000:00:14:0-usb-0: 10.2:1.0-port0",
                baud: 230400
joints:
        TWIST:
                currentlimit: 5.0
                servo_id: 39
                max: 500000
                min: -484000
                polarity: 1.0
                rest: 0.0
```

```
- tensorflow: 2.1.0
- giant_robotics: 1.5
- giant_camera: 1.4
- realsense_lib: 1.2.7
- influx: 1.4
- giant_ml: 1.8
```

```
- giant_2.4.3.Dockerfile
```

400

600

PREPARE MECHANICAL SYSTEM
602

OBTAIN CONFIGURATION DATA FOR
MECHANICAL SYSTEM 604

TRAIN MECHANICAL SYSTEM 606

ASSIGN MECHANICAL SYSTEM TO
LOCATION 608

PROVIDE TASK TO MECHANICAL
SYSTEM 610

MONITOR PERFORMANCE OF TASK
612

RETREIVE TASK PERFORMANCE
DATA 614

RETREIVE TASK EXPERIENCE DATA
616

SEND TASK PERFORMANCE DATA
618

SEND TASK EXPERIENCE DATA 620

CONFIGURING AND MANAGING FLEETS OF DYNAMIC MECHANICAL SYSTEMS

CROSS-REFERENCE TO RELATED APPLICATIONS

This patent claims the benefit of U.S. Provisional Patent Application 63/169,719, filed 1 Apr. 2021, titled "Configuring and Managing Fleets of Dynamic Mechanical Systems." The entire content of each aforementioned patent filing is hereby incorporated by reference.

BACKGROUND

The present disclosure relates generally to mechanical systems and, more specifically, to configuring and managing fleets of dynamic mechanical systems, like robots.

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment.

SUMMARY

The following is a non-exhaustive listing of some aspects of the present techniques. These and other aspects are described in the following disclosure.

Some aspects include a distributed robot management system, including: a first fleet of robots at a first facility; and a robot management server system remote from the first facility and communicatively coupled with the first fleet of robots via a network, wherein the robot management server system is configured to: provide configuration information to the first fleet of robots, maintain a remote representation of state of robots in the first fleet of robots, receive and store data from the first fleet of robots, and provide computing resources by which robots in the first fleet of robots are trained.

Some aspects include a system that includes: one or more robot management servers comprising: a management module; an experience collection module; a configuration module; and a training module, wherein the robot management servers are operative to manage and configure a fleet of robots.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

To easily identify the discussion of any particular element or act, the most significant digit or digits in a reference number refer to the figure number in which that element is first introduced.

Figure 1:
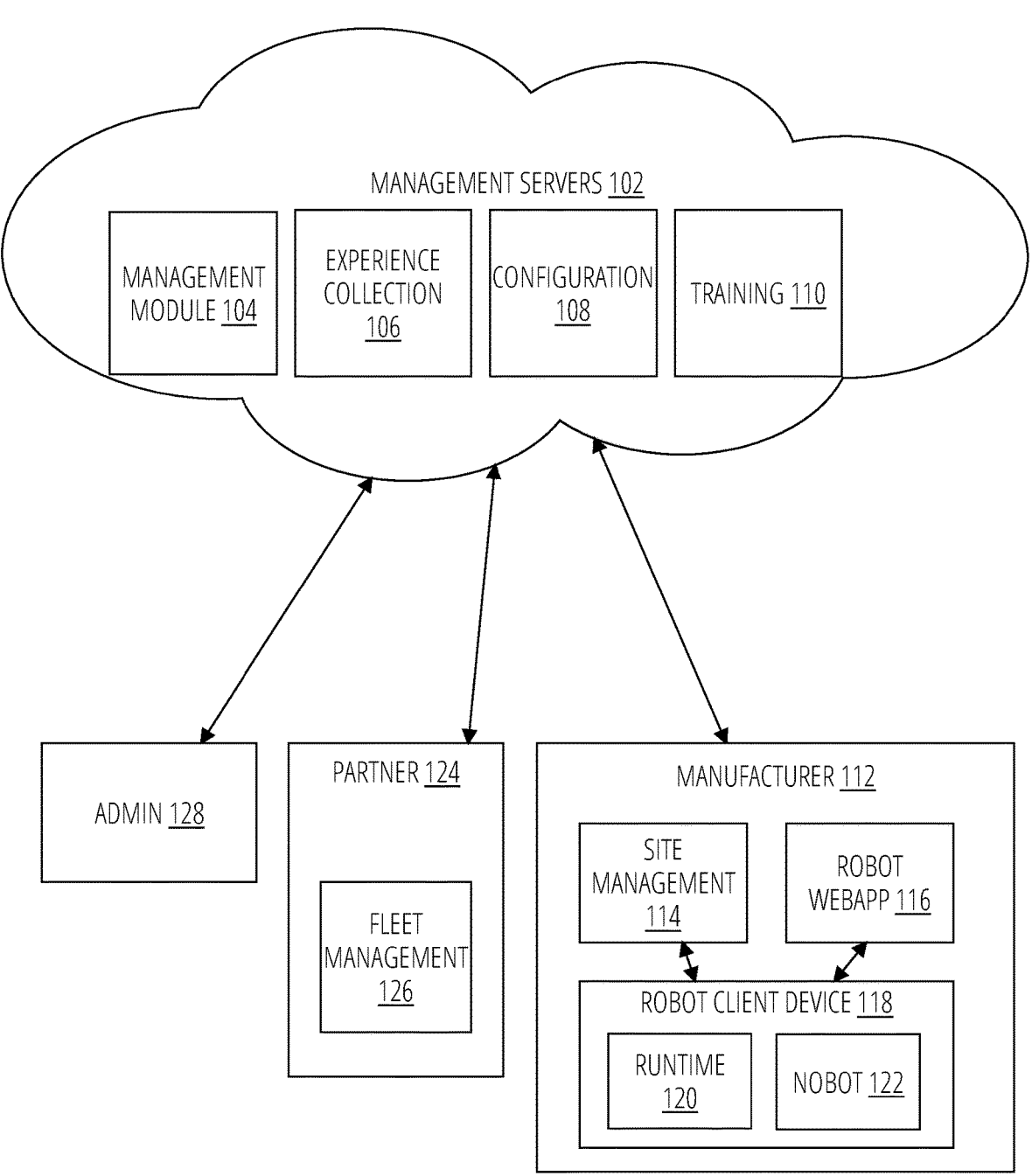
FIG. 1 illustrates an example architecture of servers and services for configuring, deploying, and managing one or more dynamic mechanical systems in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The following technical product specification describes an example of a computer system that may be used to configure and manage a fleet of robots like those described in U.S. patent application Ser. No. 16/918,999, filed 1 Jul. 2020, titled Artificial Intelligence Actuated Robot, the contents of which are hereby incorporated by reference. Other types of robotics may also be configured and managed with the present techniques, which are expected to be particularly beneficial in unstructured and semi-structured environments, like those encountered by drones and self-driving vehicles. Or other types of dynamic mechanical systems may similarly be configured and managed with these techniques. It is understood that "dynamic mechanical system" and "robot" and "robot system" are used herein interchangeably.

FIG. 1 illustrates an example architecture of servers and services for configuring, deploying, and managing one or more dynamic mechanical systems in accordance with some embodiments. The example architecture 100 includes management server 102, manufacturer 112 (e.g., a computing device thereof), partner 124 (e.g., a computing device thereof), and admin 128 (e.g., a computing device thereof).

Management server 102 may be one or more servers including management module 104, experience collection 106, configuration 108, and training 110. Management server 102 may provide administrative functionalities including validating application program interfaces (APIs) and assignment of robots. The server cluster of management server 102 may be replicated and implemented with redundancy (e.g., using load balancers or as a distributed, fault-tolerant architecture).

Management servers 102 may maintain connection between each dynamic mechanical system. Fleet management module 104 in some embodiments, is responsible for providing information on demand about each robot in the fleet. The information of each robot may include manufacturing date, model number, transient information (e.g., physical location, owner of robot, current power status, current configuration).

Experience collection 106 may include information obtained from one or more robots in performance of one or more tasks. Experience data may be obtained in various forms including sensor data and any available context information (e.g., information relating to the environment in which the task was performed).

Configuration management 108 stores robot configuration information and associated assets. Configuration management 108 stores information including hardware configuration of each robot, task information, assets, and dependencies for execution of a task, and system configuration data. The configuration assets may include neural network weights, software libraries, third party software libraries, or any suitable data for robot deployment and execution. Configuration management 108 may be configured to detect failures by a dynamic mechanical system before, during, or after performance. Configuration 108 may include any combination of the following: hardware configuration, task configuration, and system configuration. The hardware configuration is performed on a robot to configure the physical hardware of the system. For example, the hardware configuration includes selection of a valid range-of-motion of servos, field-of-view of cameras, GPS coordinate identifiers. The task configuration includes information relating to a particular task for performance by a robot. In some embodiments, task configuration includes data describing the parameters associated with neural networks and algorithms and the physical requirements for performance of a particular task. System configuration includes information relating to one or more software programs running on the robot. For example, a robot includes giant.ai software libraries and versions.

Training 110 may include training data associated with training one or more machine learning models. Training 110 may also include sensor data obtained by a robot client device 118. The sensor data may be used as inputs to training module 110 in updating and training machine learning models. In some embodiments, the training 110 module may train one or more robots (e.g., robot client device 118) while the robot is still at the factory (e.g., manufacturer 112). In some embodiments, when a robot is set up to enter training mode, training 110 may perform any combination of the following tasks including, setting up a connection with the robot client via robot webapp 116, training the robot using training data and configuration information from previous trainings, training the robot to perform a new task through manual inputs, audio cues, demonstrations, remote control, sending experience data to experience collection 106, sharing data pertaining to the training with one or more modules including configuration 108, management module 104, and experience collection 106. In one example, training may be performed on a dynamic mechanical system. During performance of a new task, a user may provide the dynamic mechanical system with auditory feedback (e.g., "yes", "no", "good", "bad"). The dynamic mechanical system may automatically adjust performance of the new task based on the received auditory feedback. The user generated auditory feedback may be transmitted to one or more servers for further processing.

Manufacturer 112 provides dynamic mechanical systems (e.g., robot client device 118) and may include site management 114 and robot webapp 116. Robot client device 118 may include code that runs on a physical, mechanical device (e.g., robot). Each robot client may provide a web interface, robot webapp 116 to provide assistance with configuration of the robot and uploading experience data. Site management 114 may be an application supported by a machine hosted at the manufacturer 112, a location where the dynamic mechanical systems are produced, installed, and/or deployed. It is understood that there may be more than one site management 114 console at the manufacturer 112. In some embodiments, a console of site management 114 is configured for handling a portion of the site of the manufacturer 112.

Robot client device 118 includes a runtime module 120 and nobot 122. Runtime module 120 includes a robot computer associated with the robot and responsible for performance of the robot including driving the servos, collecting sensor data from the sensors, running policies, neural networks, or any algorithms relating to performance of tasks. In some embodiments, runtime 120 coordinates with configuration 108 to configure the robot, coordinates with experience collection 106 for transmitting experience data, and coordinates with management module 104 to provide the status of the robot. Additionally, runtime 120 may include an interface for configuring and training tasks on the robot itself. Nobot 122 is a computing system that may be in some embodiments, physically separated from the robot client device 118 or runtime 120. The nobot 122 is tasked with hosting in-depth introspection and feedback tools without unnecessarily burdening the robot computer (e.g., runtime 120). The nobot 122 may process visualizations of statistical information, perform troubleshooting, application development, and more via a high-speed data pipeline (e.g., GigE) while robot client device 118 is running. In some embodiments, a single robot 122 is associated with multiple robots. In some embodiments, the nobot 122 performs all non-integral processing (e.g., processing not related directly to robot control or performance) which prevents non-critical functions from consuming resources on the robot computer (e.g., runtime 120).

Site management 114 console, in some embodiments is used to perform various administrative tasks. The site management 114 console is configured to allow administrators at the manufacturer 112 to obtain information about the performance of robots in the facility and can be configured to communicate directly with each robot on site. Site management 114 can perform tasks including, but not limited to: configuration of robots for performance of a specific task, checking robot statuses, start/stop/pause/resume robot activity remotely, generate and view reports of robot performance, creation of location hierarchies, assignment of robots to a particular location, and creating and managing users at a particular site. It is contemplated that the site management 114 may be one or many site management consoles at a particular site, each for controlling a select building, floor, assembly line, or other division. A particular site management 114 console could be configured to view the site at a particular level in the location hierarchy (e.g., building A or floor 2).

Partner 124 may be an environment for deployment of mechanical systems. Partner 124 may be a third party, a sandbox, an operation field, assembly line, or any other suitable environment for dynamic mechanical system performance. Fleet management 126 includes an application running on a machine that may be used for high level management and reporting of activities of dynamic mechanical systems within partner 124. Fleet management 126 may be configured for performing tasks including management of site creations, management of users, management of report creation, and viewing robot statuses on a dashboard.

Admin 128 may be a global management console that manages and configures any of the partners, users, and manufacturers discussed herein. Admin 128 may be configured to perform tasks including management of administrative users and respective access levels, management of partners, viewing robot data, viewing fleet statistics, requesting robot statuses, creating and managing tasks, managing configurations of individual robots, managing configurations of fleets of robots, manage configuration of robot models, creating and view reports, and analyzing experience data. Typically, there are three classes of users of the various system APIs described herein—the administrator, partner employees, and robots. Generally, the broadest level of access is granted to giant.ai administrators. Partners (e.g., third parties) may be restricted to accessing APIs relating to its own services and its own robot fleet. Robots then are further restricted to accessing APIs relating to itself. For example, a robot may ask the server for tasks that the robot is able to perform. The server may provide a list of tasks that are enabled for performance by the robot. Additionally, the server may provide a filtered list of tasks that are enabled for the robot. Access can be limited or restricted based on one or more characteristics of the robot (e.g., hardware capabilities, robot location). In some embodiments, the system supports access control lists that can be used to fine tune which features a particular user can access. These can be grouped into broadly useful user capabilities—for instance, the capability 'Reporting' would have access to features requiring the 'ROBOT_READ', 'SITE_READ', or 'PARTNER_READ' rights. Administrators can customize these categories in accordance with their needs. Generally, requests and commands can play out over a series of exchanges and need not be consolidated into a single transmission, e.g., a request for a configuration may include a request to authenticate the requestor which is then followed by a request that elicits the configuration data sent via a secure encrypted channel established with the first request, and this collectively can serve as an example of a request for configuration data, as can the second request therein individually.

Figure 2:
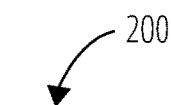
FIG. 2 illustrates an example machine learning system for management of dynamic mechanical systems in accordance with some embodiments.
Figure 2:
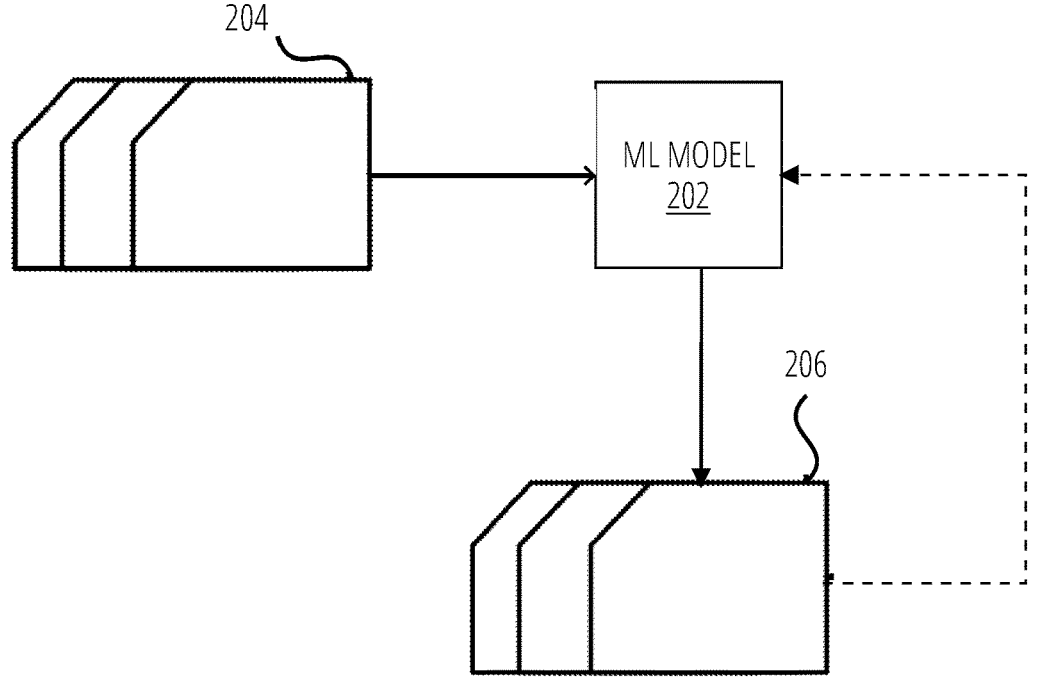

FIG. 2 illustrates an example machine learning model 200 in accordance with some embodiments. Machine learning model 202 may take inputs 204 and provide outputs 206. In one use case, outputs 206 may be fed back to machine learning model 202 as inputs to train machine learning model 202 (e.g., alone or in conjunction with user indications of the accuracy of outputs 206, labels associated with the inputs, or with other reference feedback and/or performance metric information). In another use case, machine learning model 202 may update its configurations (e.g., weights, biases, or other parameters) based on its assessment of its prediction (e.g., outputs 206) and reference feedback information (e.g., user indication of accuracy, reference labels, or some other information). In another example use case, where machine learning model 202 is a neural network and connection weights may be adjusted to reconcile differences between the neural network's prediction and the reference feedback. In a further user case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate results (e.g., task completion time predictions, urgency levels, maintenance timelines, end-of-life predictions) with better recall, accuracy, and/or precision.

The machine learning model 202 may be structured as a factorization machine model. The machine learning model 202 may be a non-linear model and/or supervised learning model that can perform classification and/or regression. For example, the machine learning model 202 may be a general-purpose supervised learning algorithm that the system uses for both classification and regression tasks. Alternatively, the machine learning model 202 may include a Bayesian model configured to perform variational inference, for example, to predict whether an action will be completed by the deadline. The machine learning model 202 may be implemented as a decision tree and/or as an ensemble model (e.g., using random forest, bagging, adaptive booster, gradient boost, XGBoost, etc.).

Figure 3A:
FIG. 3A-3D illustrates an example code sample for configuration of dynamic mechanical systems in accordance with some embodiments.

FIG. 3A-3D illustrate examples of sample code of configuration of dynamic mechanical systems in accordance with some embodiments. FIG. 3A includes code 300a describing a sample task configuration file 'task_pnp_103.yaml.' The code 300 of task configuration file includes details about a task. In the given example, the task is a "right to left pick and place task." Code 300a includes descriptions of assets and dependencies used in performance of the task.

Figure 3B:

FIG. 3B includes code 300b describing hardware configuration of a robot in accordance with some embodiments. Code 300b includes descriptions of hardware used by the robot including cameras, finger and joint sensors. Each hardware component may include physical limitations that are described in the code 300b.

Figure 3C:

FIG. 3C includes code 300c describing system configuration of software running on a robot in accordance with some embodiments. Code 300c includes descriptions of the various software programs currently installed or running on a robot. The example code 300c shown includes six discrete software programs but it understood that more or fewer software programs may be used by a robot depending on the selected parameters and operating environment.

Figure 3D:

Additionally and/or alternatively, code 300c may be contained in a single Docker file 300d stored on the robot as shown in FIG. 3D.

Figure 4:
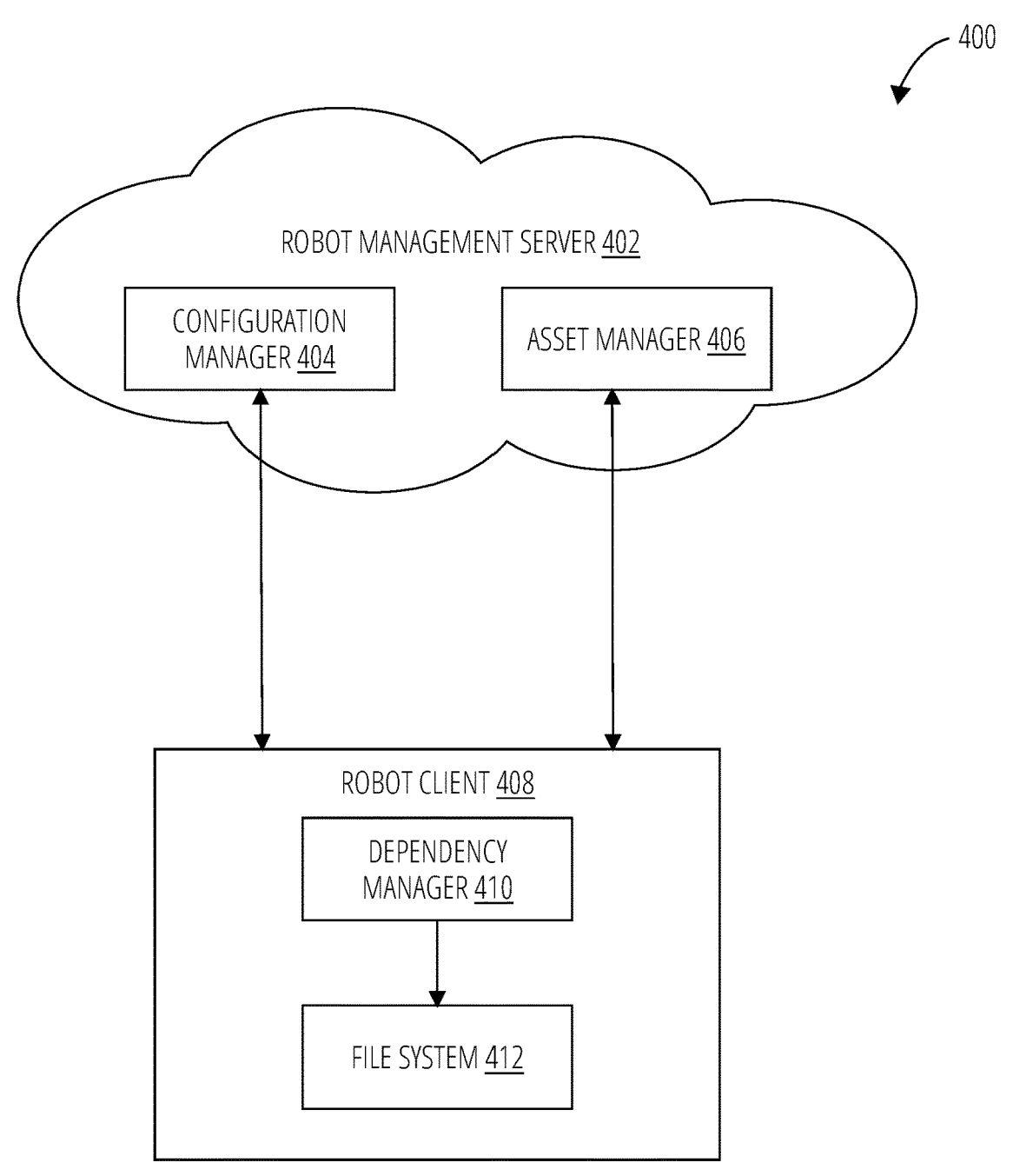
FIG. 4 illustrates an example dependency model of dynamic mechanical systems in accordance with some embodiments.

FIG. 4 illustrates an example dependency model 400 of dynamic mechanical systems in accordance with some embodiments. Robot management server 402 may be an embodiment of Management servers 102 and includes configuration manager 404 (similar to 104, FIG. 1) and asset manager 406. Robot client 408 may be an embodiment of robot client device 118 including a dependency manager 410 and file system 412. As described above with respect to FIG. 1, hardware, system, and task configuration may be managed separately. In some embodiments, hardware, system, and task configuration is managed together as there may be dependencies between the different configurations. As an example, a first task may use a particular system configuration in order to run.

Hardware configuration may include details relating to basic information relating to a particular robot model (e.g., model number), calibration information relating to a particular robot, and peripheral information specific to a particular robot. As calibration and peripheral data may change over a duration of the robot's lifecycle, hardware configuration updates may be pushed from the robot to the server.

Each individual task has an associated task configuration file that specifies the assets, dependencies, and additional configuration metadata that provides information for the robot to perform the task. Task configuration, in some embodiments, contains data that is common across multiple robots performing the same task (e.g., task name and basic algorithm for task training) as well as data specific to a particular robot (e.g., data created during task training at a specific robot). In some embodiments, the configuration manager 404 may maintain a dependencies mapping which tracks the interdependencies between a task, hardware configuration, and system configuration. In some embodiments, dependencies are checked by a component on the robot client 408 (e.g., dependency manager 410) which may reconfigure the robot client 408 to match the dependencies associated with performance of a task and also may raise a flag when a dependency cannot be fulfilled. Although a single robot typically has one hardware or system configuration, there is no hard limit on the number of tasks it can be simultaneously configured to do. A list of tasks available for a particular robot is stored by robot management server 402; an operator can choose to enable a robot for a task by choosing from the list of available tasks, and in some embodiments, the robot will then need to be trained to that task before the task is said to be operational. Multiple tasks can be enabled or operational on a single robot at one time, although only one of them is the current task—the task that the robot currently performs. Task configuration, in some embodiments, is synchronized with the server on demand, at the end of training, or when the current task is changed.

System configuration files includes operating system, firmware, and libraries used to run the robot. System configuration, in some embodiments, can be specified either as a set of libraries/modules, or as an image (or possibly a Docker File) with optional modifications. In some embodiments, system configuration is to be managed as a very small set of base configurations, plus a number of 'add-ons' for optional modules installed on the robot.

In some embodiments, the dependencies (hardware, task, and system) are hierarchical. For example, a task may use a specific hardware and system configuration and the hardware configuration may require a specific system configuration. However, the system configuration may not have any hardware or task requirements which prevents circular redundancies. In some embodiments, configuration assets are received from asset manager 406 to maintain separation and security. The communication between the robot and the robot management server 402 is encrypted in accordance with some embodiments. To authenticate, the server may present its public key to establish its identify and set up an encrypted channel. The client device (e.g., robot client 408) validates its own identify and data exchange may proceed between the server and the client. In some embodiments, the unique identifier of the robot may be encoded in the client certificate and is used in the API requests to the server. The server may track the robots unique identifier associated with the encryption session and responds with configuration data appropriate to the robot making the request.

At various occasions during its operation the robot may exchange configuration data with the server. These occasions may include the following:

When the robot boots. When the robot is powered on, it will request current configuration from the server. All three configuration types—task, hardware, and system—are expected to be received at this time.

When the hardware is recalibrated or updated. When the robot is physically modified as part of routine maintenance, or receives a hardware upgrade, then the robot's webapp can be used to update the hardware configuration on the robot, and sync that data with the Giant server suite.

When requested by the Site Management Console or the robot webapp. The operator of the Site Management Console may trigger either download or upload of the current configuration data.

When configuration data is downloaded to the robot, in some embodiments, it is handed to the dependency manager 410 to resolve dependencies and assure that all associated assets are available on the robot. This includes making changes to the software libraries installed on the robot, as well as downloading any assets that are needed by the task configurations. Said assets include, but are not limited to (which is not to suggest that other lists are limiting), neural network configurations and weights.

If the dependencies cannot be resolved or the assets cannot be found, in some embodiments, the Dependencies manager rejects the entire configuration, and the robot reverts back to its previous state.

Note that, in some embodiments, the unique id of the robot is included in all requests (including configuration requests) from the robot to the servers. The configuration data sent by the server, in some embodiments, will be specific to the robot making the request, and may depend not only on the make and model of the robot, but other properties associated with the robot—such as partner or administrative groupings.

The configuration data may be stored on the robot client 408 as one or more yaml files. These files, in some embodiments, are stored the configuration directories configs/hw, configs/sw, and configs/task. For data management purposes there may be multiple yaml files in each directory, however, the data in each directory may be exposed in a uniform API. That is, although the hardware directory may contain files 'model.yaml' and 'instance.yaml', describing, respectively, hardware configuration associated with all robots of a particular model and the configuration associated with a specific robot, API calls to the hw_config module hide that particular implementation detail.

Dependencies, in some embodiments, are specified in a dependencies section of the configuration file. Software dependencies may be specified as package names and version numbers. Hardware dependencies may be specified by ids corresponding to validated hardware.

Figure 5:
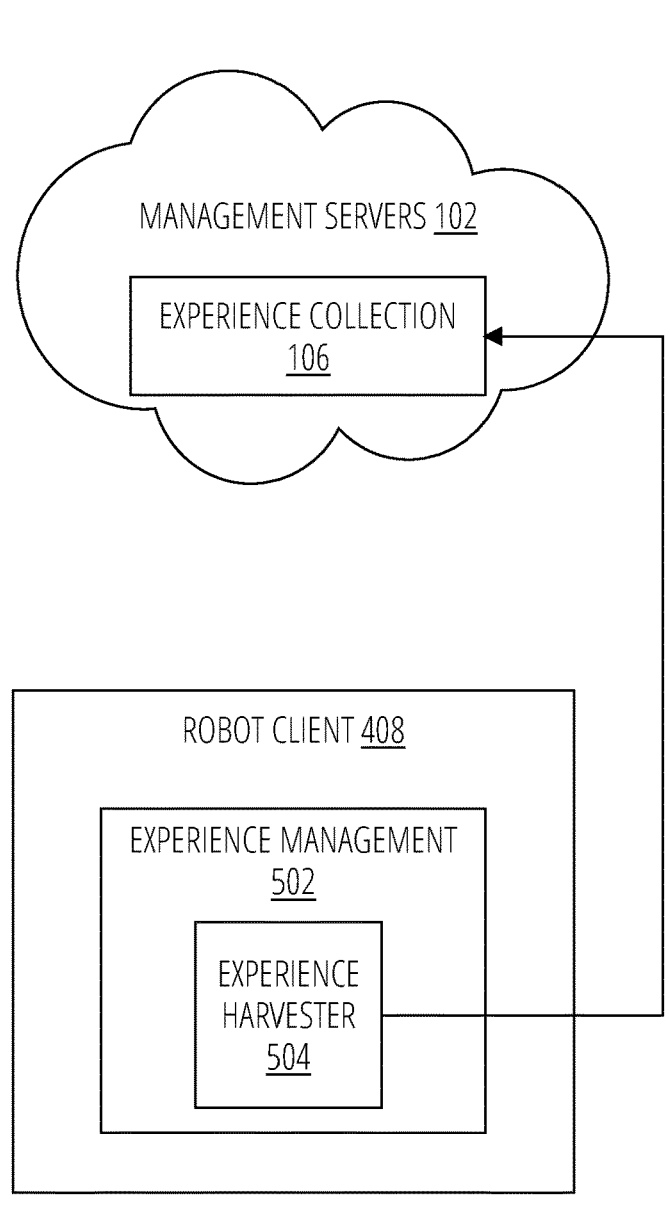
FIG. 5 illustrates an example system for experience collection and management of dynamic mechanical systems in accordance with some embodiments.

FIG. 5 illustrates an example system for experience collection and management of dynamic mechanical systems in accordance with some embodiments. System 500 includes Management servers 102 including experience collection 106 in communication with robot client 408 having an experience management 502 module and experience harvester 504.

When the robot is running, in some embodiments, it is collecting runtime experience via experience harvester 504. This may include streams of data from the robot's sensors, information about the task that the robot is running, the robot's success at that task, and any exception conditions that the robot encounters. This information, in some embodiments, can be transmitted back to the robot management server 102 via experience management 502 for analysis.

Since the volume of runtime experience may be very large, a variety of mechanisms may be used to reduce the amount of data that is sent to the servers. At a high level, in some embodiments, configuration for the robot may specify experience filters to reduce the amount of data processed. These filters can tell the system to capture data only at a certain frequency, or only at a certain level, or only for certain modules. In some embodiments, partners (e.g., third party users) may also specify filters if they want to ensure that particular types of data are not transmitted to the servers.

After processing the data through the filters, in some embodiments, a compressor reduces the size of the data, and packages it into blocks for storage and later transmission. In some embodiments, experience harvester 504 is responsible for sending data to the servers, or deleting it if there is no longer space for it on local storage. The experience harvester 504 can be configured to preferentially purge data from specified modules, giving data from other modules a greater chance of being sent back to the server. Data, in some embodiments, may also be tagged at runtime with an 'interest metric' that also increases the importance (and therefor longevity) of the data.

During standard operations, a robot is turned on, positioned for its task, and given a command to start the task. The robot performs the task until it is completed, stopped, or paused. The robot may stop or pause if 1) a local operator has pushed the 'stop' or 'pause' button on the robot, 2) a remote operator has caused the robot to 'stop' or 'pause', 3) the task has completed, or 4) the robot has encountered a condition for it to stop or pause.

In a normal stop, in some embodiments, the robot goes through its standard shutdown routine, which may include moving into the standard shutdown position. This is considered to be a level 1 stop per IEC 60204-1, where the robot is controlled during the shutdown and power is removed from the servos when the stop is finished.

'Pause' is considered to be a level 2 stop per IEC 60204-1, where the servos are no longer receiving commands, but remain powered. When pausing, in some embodiments, the robot holds its position and waits for additional commands from the operator. During the paused state, in some embodiments, the operators are free to correct any condition that prompted the pause, to stop the robot, to enter a troubleshooting session (see section on Troubleshooting), or to give training feedback to the robot (see section on training). The robot, in some embodiments, will not resume operation from the paused state without being explicitly commanded by an operator.

'Servo Power' is a level 0 (uncontrolled) stop, where power is immediately removed from the servos. The 'stop' and 'pause' commands, in some embodiments, are available via both physical buttons attached to the robot and via API calls from the Site Management Console. The 'start' and 'resume' commands are similar, except that the 'start' and 'resume' API calls are available if both a physical 'Remote Start' switch on the robot is set to 'ON', and the robot is enabled for 'Remote Start,' in some embodiments. This prevents the robot from being unintentionally started or restarted in situations where doing so could be harmful to the robot or its environment.

Data collected during performance of a task including time started, time elapsed, time paused, time completed may be transmitted by robot client 408 through experience harvester 504 to experience collection 106. The experience collection 106 may use some or all of the collected data to integrate with established monitoring and administrative systems.

Figure 6:
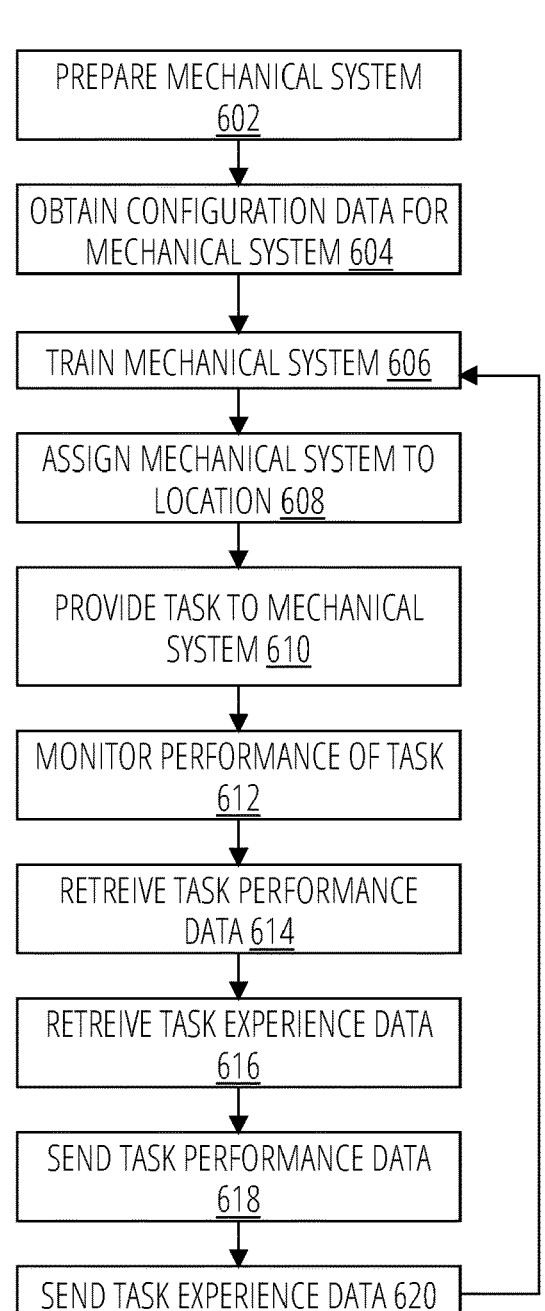
FIG. 6 illustrates a flow diagram of a method for managing dynamic mechanical systems in accordance with some embodiments.

FIG. 6 illustrates a flow diagram of a method for managing dynamic mechanical systems in accordance with some embodiments. Method 600 is performed at a computing device (e.g., management server 102). In some embodiments, the steps of method 600 is to be implemented at a robot client (e.g., robot client device 118).

Method 600 begins when computing device prepares (602) a mechanical system (e.g., dynamic mechanical system). Preparation of a mechanical system may include physically assembling the mechanical system. The computing device may then obtain (604) configuration data for the mechanical system. In some embodiments the configuration data includes hardware configuration data, task configuration data, and system configuration data. The computing system may then train (606) the mechanical system using any of the methods described herein. After training the mechanical system, the computing device may assign (608) the mechanical system to a location. For example, a mechanical system is one of many mechanical systems configured to perform harmoniously as a fleet of mechanical systems. A first mechanical system may be assigned to location A, whereas a second mechanical system is assigned to location B. The assigned locations and assignment of a mechanical system to a particular fleet may be changed or updated at any time.

After the computing system assigns a location to the mechanical system, it provides (610), one or more tasks to be completed by the mechanical system. As an example, a robot (e.g., mechanical system) is part of an assembly line in constructing a car. The robot may be tasked with installing a tire onto the car body. The computing system monitors (612) performance of the task and may receive data flows relating to sensor information captured by the robot. The computing system may then retrieve (614), task performance data. Task performance data may include details regarding how the task was performed, whether it was performed successfully, the duration of the task, sensor readings from the robot performing the task, or any other details relating to performance of the task. Additionally, and/or alternatively, the computing system retrieves (616) task experience data. Task experience data may differ from task performance data. Task experience data refers to data collected with respect to peripheral conditions observed during the performance of the task, whereas task performance data refers to data collected with respect to the actual performance of the task. In some embodiments, the task performance data is sent (618) to a server for processing. For example, the task performance data is sent to a machine learning model 202. Method 600 may also include computing system sending (620) task experience data to train the mechanical system.

Figure 7:
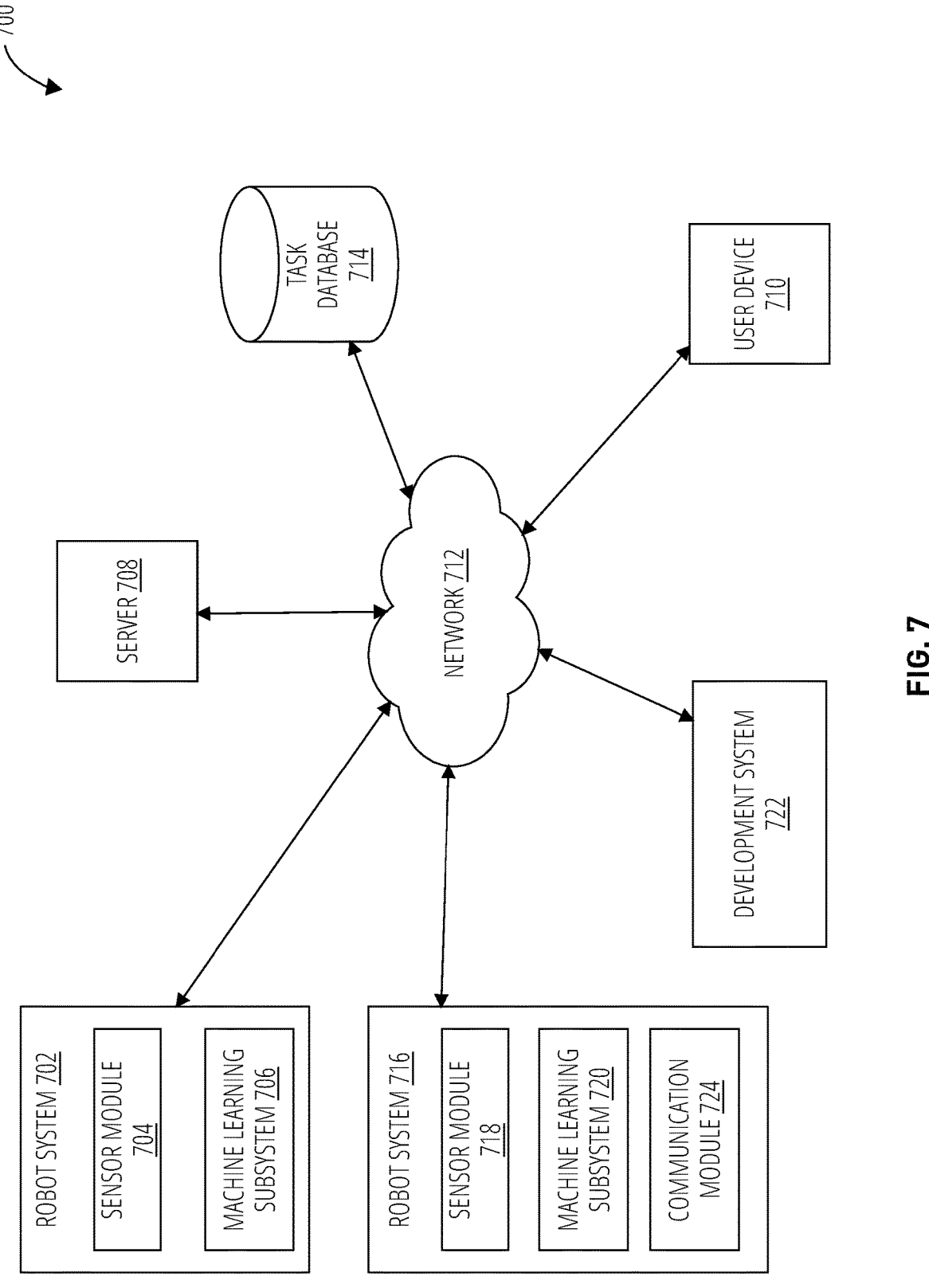
FIG. 7 illustrates a block diagram of a representative system including one or more robot systems in accordance with some embodiments.

FIG. 7 illustrates a block diagram of a representative system 700 including one or more robot system 702 in accordance with some embodiments.

The computing system 700 may include a robot system 702, robot system 716, development system 722, server 708, user device 710, and task database 714. The robot system (e.g., robot system 716) may include a sensor module 718, a machine learning subsystem 720, and communication module 724.

Robot system 702 is an example of a robot that includes a sensor module 704 and a machine learning subsystem 706. Additional modules may be included but are not illustrated in FIG. 7. Robot system 702 may be modularly configurable, meaning, one or more modules may be added or removed from the robot system 702. Robot system 716 may be substantially the same robot as robot system 702.

Sensor module 704 of robot system 702 may include a plurality of sensors including temperature sensors, pressure sensors, cameras, inertial measurement units (IMUs), and other various configurable sensors. Each of the sensors may be configured to provide sensor data to an onboard computer system or transmitted via network 712 to one or more computing devices including server 708 and/or user device 710.

The machine learning subsystem 706 may include a plurality of machine learning models. For example, the machine learning subsystem 706 may pipeline an encoder and a reinforcement learning model that are collectively trained with end-to-end learning, the encoder being operative to transform relatively high-dimensional outputs of a robot's sensor suite into lower-dimensional vector representations of each time slice in a latent embedding space, and the reinforcement learning model being configured to update setpoints for robot actuators based on those vectors. Some embodiments of the machine learning subsystem 706 may include an encoder model, a dynamic model, an actor-critic model, a reward model, an anomaly detection model, or a variety of other machine learning models (e.g., any model described in connection with FIG. 2. One or more portions of the machine learning subsystem 706 may be implemented on the robot system 702, the server 708, or the development system 722. Although shown as distinct objects in FIG. 7, functionality described below in connection with the robot system 702, the server 708, or the development system 722 may be performed by any one of the robot system 702, the server 708, or the development system 722. The Robot System 702, the server 708, or the development system 722 may communicate with each other via the network 712.

The communication module 724 may be used by the robot system 716 to communicate with another robot system (e.g., Robot System 702), server 708, development system 722, user device 710, task database 714, or any other networked peripheral device.

The development system 722 may be in communication with robot systems, user devices, prediction databases, and servers as a platform for application development. Applications are understood to mean any type of robotic interface, robotic tasks, dashboard displays, or any other application aided by utilizing sensor data collected from the robots in the robot system.

Task database 714 may include a directory of possible tasks that the fleet of robots are able to handle. For example, task database 714 includes a list of various categories of tasks that a set robot is able to perform. Robot A may be able to pick up, carry, and deposit objects weighing up to 25 pounds, whereas Robot B may only be able to pick up, carry, and deposit objects weighing up to 5 pounds. The actuation database may include data pertaining to robot capabilities as well as historical information on performance of tasks (e.g., wear-state vectors for each actuator of each robot). Additional information may be stored at the actuation database including optimization algorithms, one or more machine learning models, training data, historical data, metadata, performance data, and cost-schedules.

The robot system 702 may obtain records generated from one or more user devices user device 710. User device 710 may be used as input devices from human operators instructing the robot to perform one or more tasks. For example, user A of user device 710 submits a request for performance of a set of tasks. The request may be routed through network 712, to task database 714, server 708, development system 722, and/or robot system 702 or robot system 716 for performance of the set of tasks.

The robot system 702 may include one or more cameras that may be used to record the environment surrounding the robot system 702. The cameras may include one or more RGB cameras (e.g., with a complementary metal oxide semiconductor), one or more infrared cameras, one or more depth sensing cameras or a variety of other cameras. In some cases, the cameras are arranged in stereoscopic arrays, and some embodiments use structured light, time-of-flight, or LIDAR to sense depth. The development system 722 may output video or images obtained via cameras of the robot system 702 to a display device of the robot (not shown). The display device may include a virtual reality headset, an augmented reality display (e.g., augmented reality glasses), a screen, or a variety of other displays.

In some embodiments, robots implementing the present techniques may be trained and controlled with models like those described in a U.S. Pat. App. titled SPATIO-TEMPORAL CONSISTENCY EMBEDDINGS FROM MULTIPLE OBSERVED MODALITIES, assigned application Ser. No. 17/657,723, now U.S. Pat. No. 11,636,398.

In some embodiments, robots implementing the presents techniques may be trained and controlled with models like those described in a U.S. Pat. App. titled HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS, assigned application Ser. No. 17/711,960, now U.S. Pat. No. 11,478,927.

In some embodiments, robots implementing the present techniques may be administered with systems like those described in a U.S. Pat. App. titled SYSTEM FOR PRESENTING ROBOTIC DATA FLOWS FOR APPLICATION DEVELOPMENT, assigned application Ser. No. 17/711,973.

In some embodiments, robots implementing the present techniques may have touch sensors like those described in a U.S. Pat. App. titled COMBINED ANALOG AND DIGITAL ARCHITECTURE FOR HANDLING SENSORY INPUT DATA, assigned application Ser. No. 17/711,983, now U.S. Pat. No. 11,625,122.

In some embodiments, fleets of robots implementing the present techniques may be managed with systems like those described in a U.S. patent application titled SCHEDULER FOR ROBOT FLEETS, assigned: application Ser. No. 17/711,997, now U.S. Pat. No. 12,099,343.

Figure 8:
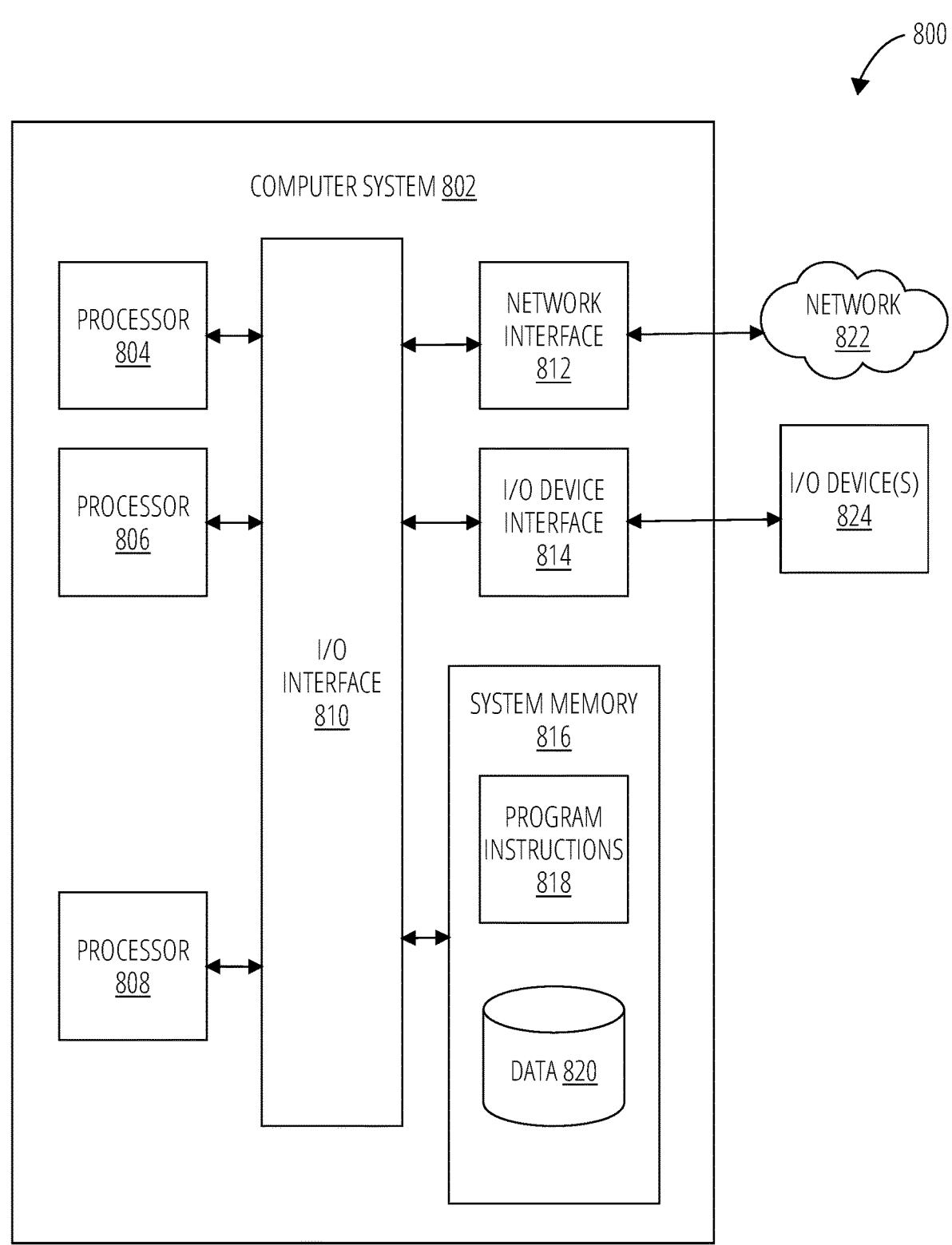
FIG. 8 illustrates an example computing device by which the above techniques may be implemented.

FIG. 8 illustrates an example system 800 depicting an example computing systems for implementing methodologies for managing dynamic mechanical systems in accordance with some embodiments. Various portions of systems and methods described herein, may include or be executed on one or more computer systems similar to computing system 800. Further, processes and modules described herein may be executed by one or more processing systems similar to that of computing system 800.

Computer system 802 may include one or more processors (e.g., processors 804, 806, 808) coupled to system memory 816, an input/output 814, and a network interface 812 via an input/output I/O interface 810. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 802. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 816). Computer system 802 may be a units-processor system including one processor (e.g., processor 804), or a multi-processor system including any number of suitable processors (e.g., 804-808). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 802 may include a plurality of computing devices (e.g., distributed computer systems) to implement various processing functions.

I/O device interface 814 may provide an interface for connection of one or more I/O devices 824 to computer system 802. I/O devices may include devices that receive input (e.g., from a user) or output information (e.g., to a user). I/O devices 824 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 824 may be connected to computer system 802 through a wired or wireless connection. I/O devices 824 may be connected to computer system 802 from a remote location. I/O device(s) 824 located on remote computer system, for example, may be connected to computer system 802 via a network 822 and network interface 812.

Network interface 812 may include a network adapter that provides for connection of computer system 802 to a network 822. Network interface 812 may facilitate data exchange between computer system 802 and other devices connected to the network. Network interface 812 may support wired or wireless communication. The network may include an electronic communication network, such as the Internet, a local area network (LAN), a wide area network (WAN), a cellular communications network, or the like.

System memory 816 may be configured to store program instructions 818 or data 820. Program instructions 818 may be executable by a processor (e.g., one or more of Processors 804-808) to implement one or more embodiments of the present techniques. Instructions 818 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 816 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 816 may include a non-transitory computer readable storage medium that may have program instructions stored thereon that are executable by a computer processor (e.g., one or more of processor 804-808) to cause the subject matter and the functional operations described herein. A memory (e.g., system memory 816) may include a single memory device and/or a plurality of memory devices (e.g., distributed memory devices).

I/O interface 810 may be configured to coordinate I/O traffic between processor 804-808, system memory 816, network interface 812, I/O devices 824, and/or other peripheral devices. I/O interface 810 may perform protocol, timing, or other data transformations to convert data signals from one component (e.g., System memory 816) into a format suitable for use by another component (e.g., processors 804-808). I/O Interface 810 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 802 or multiple computing systems 800 configured to host different portions or instances of embodiments. Multiple computing systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all the software components may execute in memory on another device and communicate with the illustrated computer system via inter-computer communication. Some or all the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 800 may be transmitted to computing system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

The description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A distributed robot management system, comprising: a first fleet of robots at a first facility; and a robot management server system remote from the first facility and communicatively coupled with the first fleet of robots via a network, wherein the robot management server system is configured to: provide configuration information to the first fleet of robots, maintain a remote representation of state of robots in the first fleet of robots, receive and store data from the first fleet of robots, and provide computing resources by which robots in the first fleet of robots are trained.

2. The system of embodiment 1, wherein: the system comprises a second fleet of robots at a second facility that is remote from both the robot management server system and the first fleet of robots, the first fleet of robots being associated with a first tenant account and the second fleet of robots being associated with a second tenant account; the robot management server system is configured to: provide configuration information to the second fleet of robots, maintain a remote representation of state of robots in the second fleet of robots, receive and store data from the second fleet of robots, and provide computing resources by which robots in the second fleet of robots are trained; the first fleet of robots comprises more than 5 humanoid robots; and the second fleet of robots comprises more than 5 humanoid robots.

3. The system of embodiment 1, wherein providing configuration information to the first fleet of robots comprises providing respective hardware and software configurations specific to each robot model in the first fleet and each instance of the respective robot model in the first fleet.

4. The system of embodiment 1, wherein providing configuration information to the first fleet of robots comprises providing task information describing configuration, assets, and dependencies required to execute a task with robots in the first fleet.

5. The system of embodiment 1, wherein providing configuration information to the first fleet of robots comprises: receiving a request for configuration data from a given robot in the first fleet of robots; authenticating the request with public key cryptography as being from the given robot in the first fleet of robots; and determining that that the given robot is authorized to access the confirmation information and, in response, providing the configuration information.

6. The system of embodiment 1, wherein the configuration information comprises neural network weights of a model by which at least some robots in the first fleet of robots are to be controlled.

7. The system of embodiment 1, wherein maintaining the remote representation of state of robots in the first fleet of robots comprises: providing, for at least some robots in the first fleet, manufacturing dates, model numbers, geolocations, power state, configurations, and data indicative of tasks respective robots are capable of performing.

8. The system of embodiment 1, wherein receiving and storing data from the first fleet of robots comprises: receiving and storing information gained by at least some of the robots in the first fleet of robots while operating.

9. The system of embodiment 8, wherein the information gained by at least some of the robots comprises data based on sensor traces from sensors of the at least some of the robots and data indicative of a context in which the sensor tracers were obtained.

10. The system of embodiment 1, wherein a given robot in the first fleet of robots is configured to provide at least some of the data from the fleet of robots to the robot management server system, wherein providing the at least some of the data to the robot management server system comprises: applying an experience filter to data indicative of runtime experiences of the given robot; grouping the data indicative of runtime experiences into groups; compressing the data indicative of runtime experiences; and purging the data indicative of runtime experiences from memory of the given robot after sending the groups to the robot management server system.

11. The system of embodiment 1, wherein a given robot in the first fleet of robots comprises a robot computer configured to operate as a client to the robot management server system and: control the given robot during runtime performance of tasks; configure the given robot in cooperation with the robot management server system; train the given robot; and provide state and experience data to the robot management server system.

12. The system of embodiment 11, wherein: the robot computer is configured to control more than 20 servo motors of the given robot via a reinforcement learning model configured to take as input a latent embedding space representation of a time slide of sensor data from at least five sensors of the given robot.

13. The system of embodiment 11, wherein: the robot computer is configured to host a web application or application program interface accessible to a native mobile application on a user's mobile computing device; the web application or native application provides a user interface by which the given robot is trained or configured by the user.

14. The system of embodiment 11, wherein the given robot is coupled to an auxiliary computing device, different from the robot computer, configured to present visualizations of robot performance while the given robot is operating.

15. A method comprising: providing, with a computer system, instructions for performance of a first set of one or more tasks to a robot; receiving, with the computer system, an indication of performance of the first set of one or more tasks by the robot; receiving, with the computer system, sensor data collected by the robot during performance of the one or more tasks; preparing, using the sensor data, instructions for performance of a second set of one or more tasks by the robot; and providing, with the computer system, the instructions for performance of the second set of one or more tasks to the robot.

16. The method of embodiment 15, wherein the robot is a first robot, the system comprising: providing, with the computer system, the instructions for performance of the second set of one or more tasks to a second robot.

17. The method of embodiment 15, comprising: receiving, with the computer system, an indication of the first robot powering on and a request for a current configuration; and sending, with the computer system, the current configuration for the first robot including a task, hardware, and system configuration file.

18. The method of embodiment 15, comprising: receiving, with the computer system, a failure report from the robot; providing, with the computer system, a troubleshooting program for resolving one or more failures provided in the failure report; and in accordance with an indication the troubleshooting program was unsuccessful, sending a power-down instruction to the robot.

19. The method of embodiment 15, comprising: training a machine learning model associated with providing tasks to the robot with the sensor data; and using the machine learning model, providing the instructions for performance of the second set of tasks.

20. The method of embodiment 15, comprising: providing, with the computer system, access to the robot to a third party; receiving, from the third party, a third request for performance of third set of tasks by the robot; sending, to the robot, the third set of tasks for performance; maintaining a log of one or more robots, including a physical location of each robot; and based at least in part on a location of a robot, assigning a task of the set of tasks to the robot; and determining the robot is a robot of a first type, wherein the first type is compatible with performance of the first task.

What is claimed is:

1. A distributed robot management system, comprising:
a first fleet of robots; and
a robot management server system communicatively coupled with the first fleet of robots via a network, wherein the robot management server system provides multiple classes of interfaces comprising:
an administration interface for access by a system administrator, the administration interface configured to perform system administrative functions;
a partner interface for access by a first user for a first facility at which the first fleet of robots are deployable, the partner interface configured to manage tasks of the first fleet of robots at the first facility; and
a robot interface for access by individual robots in the first fleet of robots, the robot interface configured to:
request tasks;
provide a first configuration information to the first fleet of robots, wherein the first configuration information comprises hardware configuration, system configuration, and asset configuration for one or more robots in the first fleet of robots, wherein the asset configuration comprises neural network weights of a model by which the one or more robots are to be controlled,
maintain a remote representation of states of robots in the first fleet of robots, wherein maintaining the remote representation of states of robots in the first fleet of robots comprises:
providing, for at least some robots in the first fleet, manufacturing dates of the respective robots, model numbers of the respective robots, geolocations of the respective robots, current power state of the respective robots, current configuration information of the respective robots, and data indicative of tasks the respective robots are capable of performing;
receive and store data from the first fleet of robots, and
provide computing resources by which robots in the first fleet of robots are trained;

wherein a given robot in the first fleet of robots comprises a robot computer configured to operate as a client to the robot management server system via the robot interface and:

control the given robot during runtime performance of tasks;

configure the given robot in cooperation with the robot management server system via the robot interface;

train the given robot; and provide state and experience data to the robot management server system via the robot interface;

and wherein the robot computer is configured to control more than 20 servo motors of the given robot via a reinforcement learning model configured to take as input a latent embedding space representation of a time slide of sensor data from at least five sensors of the given robot;

and further comprising a second fleet of robots, wherein the partner interface is further configured to be accessed by a second user for a second facility at which the second fleet of robots are deployable, the partner interface configured to manage tasks of the second fleet of robots at the second facility.

2. The system of claim 1, wherein providing the first configuration information to the first fleet of robots comprises providing respective hardware and system configurations specific to each robot model in the first fleet and each instance of the respective robot model in the first fleet.

3. The system of claim 1, wherein the first configuration information provided to the first fleet of robots further comprises task information and dependencies required to execute a task with robots in the first fleet.

4. The system of claim 1, wherein providing the first configuration information to the first fleet of robots comprises:

receiving a request for configuration information from a given robot in the first fleet of robots;

authenticating the request with public key cryptography as being from the given robot in the first fleet of robots;

determining that the given robot is authorized to access the configuration information and, in response, providing the configuration information.

5. The system of claim 1, wherein receiving and storing data from the first fleet of robots comprises:

receiving and storing information gained by at least one of the robots in the first fleet of robots while operating.

6. The system of claim 5, wherein the information gained by at least some of the robots comprises data based on sensor traces from sensors of the at least some of the robots and data indicative of a context in which the sensor tracers were obtained.

7. The system of claim 1, wherein a given robot in the first fleet of robots is configured to provide at least some of the data from the fleet of robots to the robot management server system via the robot interface, wherein providing the at least some of the data to the robot management server system comprises:

applying an experience filter to data indicative of runtime experiences of the given robot;

grouping the data indicative of runtime experiences into groups;

compressing the data indicative of runtime experiences; and purging the data indicative of runtime experiences from memory of the given robot after sending the groups to the robot management server system via the robot interface.

8. The system of claim 1, wherein:

the robot computer is configured to host a web application or application program interface accessible to a native mobile application on a user's mobile computing device; and the web application or native application provides access to the robot interface by which the given robot is trained or configured by the user.

9. The system of claim 1, wherein the given robot is coupled to an auxiliary computing device, different from the robot computer, configured to present visualizations of robot performance via the robot interface while the given robot is operating.

10. The distributed robot management system of claim 1 wherein the robot interface is further configured to receive and deliver updates to machine learning models deployable by individual robots in the first fleet of robots.

11. The distributed robot management system of claim 1 wherein each robot in the first fleet of robots includes a respective on-board machine learning subsystem having an encoder operative to transform high-dimensional sensor outputs into lower-dimensional vector representations in a latent embedding space.

12. The distributed robot management system of claim 1 wherein the administration interface is further configured to enable the system administrator to control access of the first user to the first fleet of robots via the partner interface and access of the second user to the second fleet of robots via the partner interface.

* * * * *